Oct. 26, 1965  F. D. RUSSELL, SR  3,213,782
PRESS FEEDER
Filed Jan. 17, 1964  3 Sheets-Sheet 1
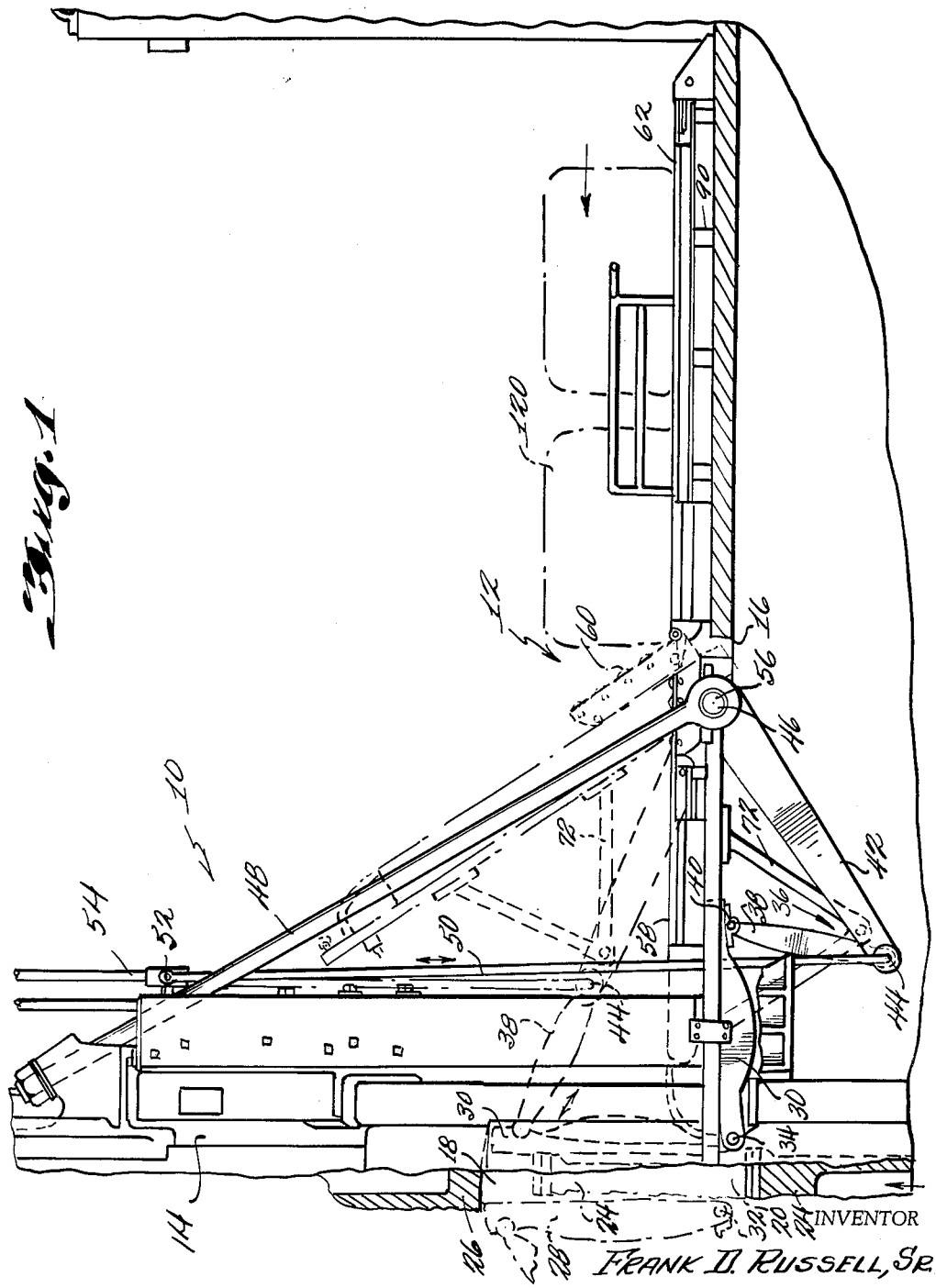
INVENTOR
FRANK D. RUSSELL, SR.
BY Cushman, Darby & Cushman
ATTORNEYS

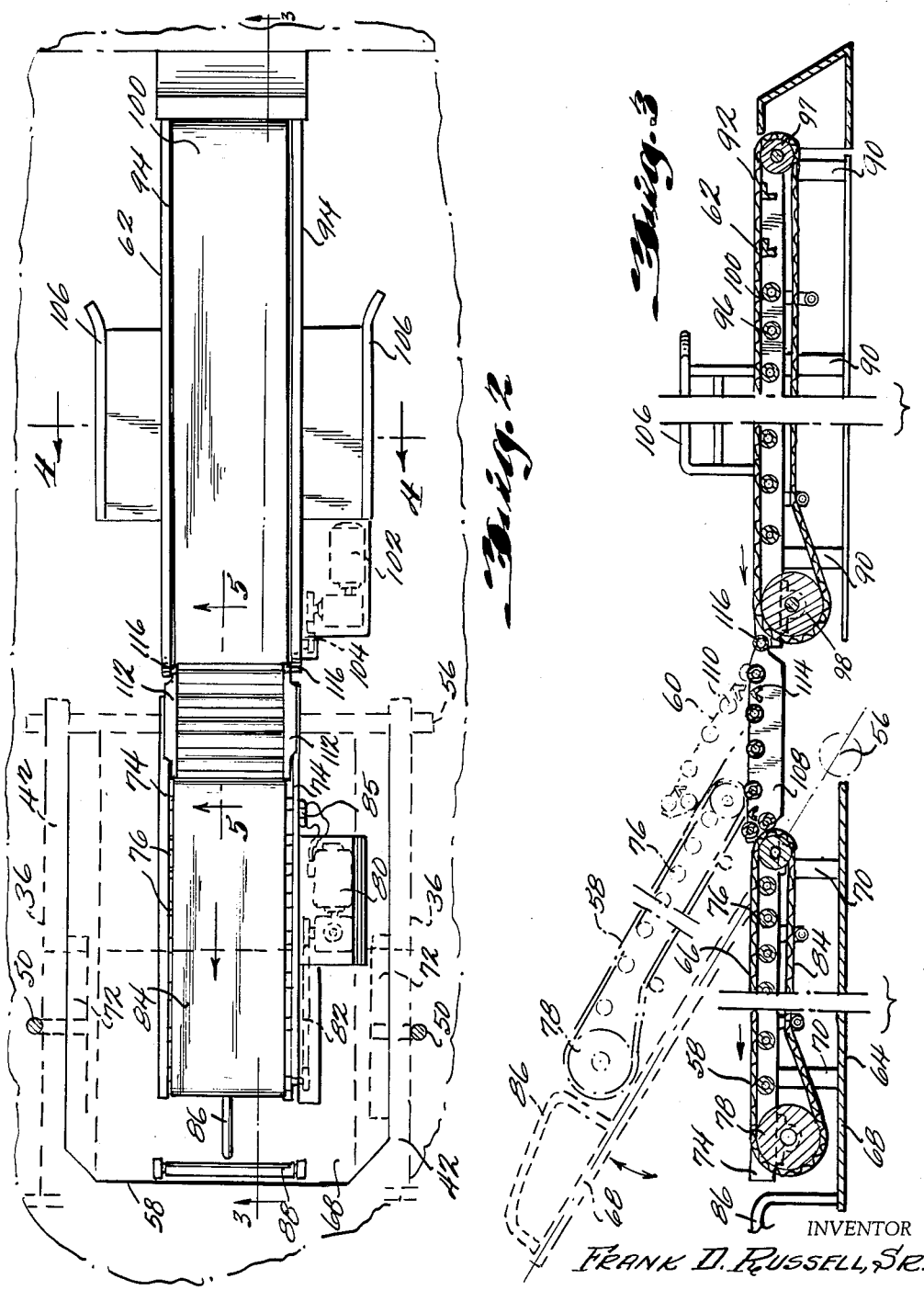

Oct. 26, 1965                F. D. RUSSELL, SR                3,213,782
                                PRESS FEEDER
Filed Jan. 17, 1964                                    3 Sheets-Sheet 3
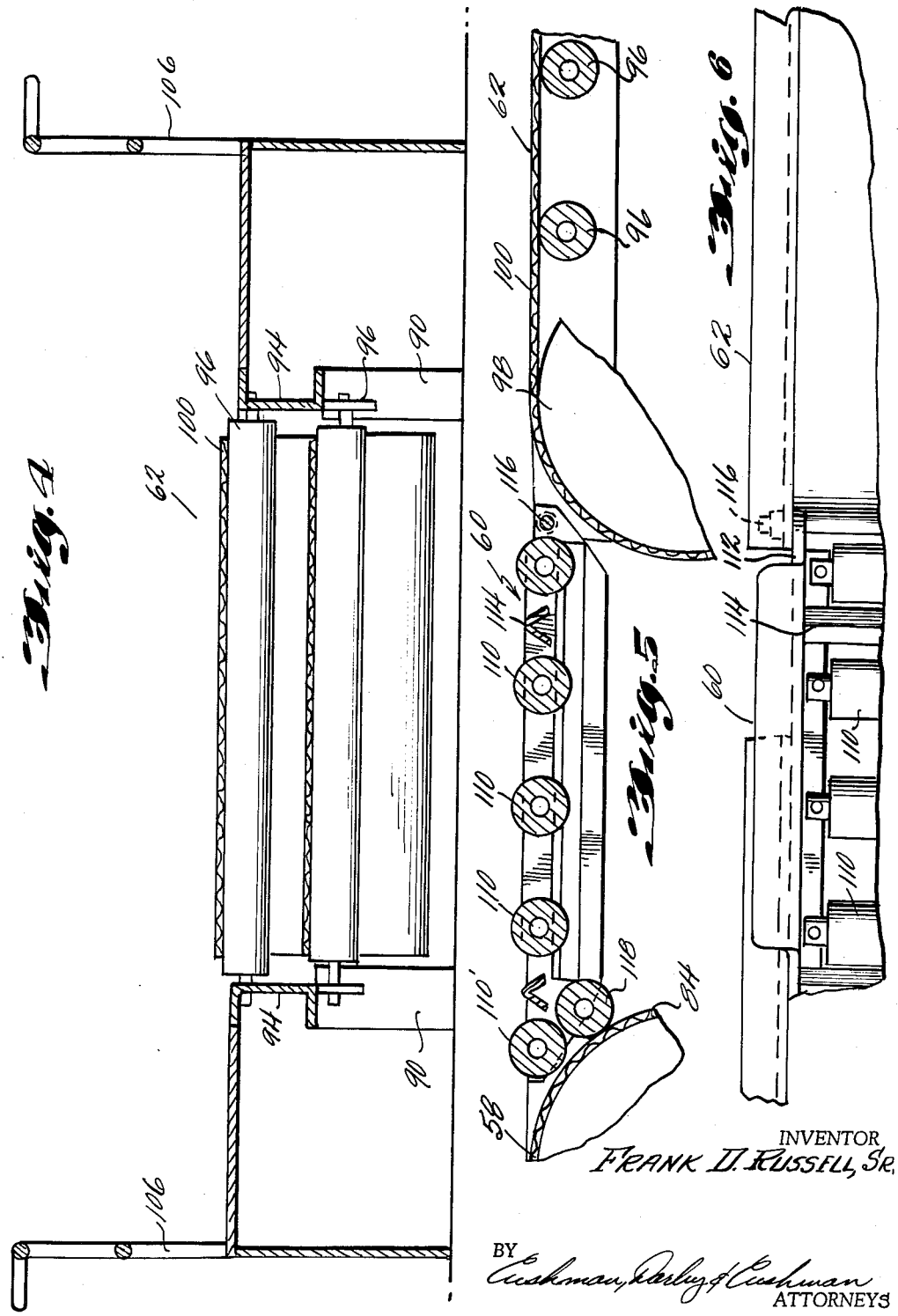
INVENTOR
FRANK D. RUSSELL, SR.
BY Cushman, Darby & Cushman
                              ATTORNEYS United States Patent Office 3,213,782
Patented Oct. 26, 1965

3,213,782
PRESS FEEDER
Frank D. Russell, Sr., Opelousas, La., assignor to Frost-Whited Company, Inc., Shreveport, La., a corporation of Louisiana
Filed Jan. 17, 1964, Ser. No. 338,486
19 Claims. (Cl. 100—43)

The present invention relates generally to baling presses and more particularly to baling presses of the type employed to effect recompression of previously baled material and means cooperative therewith for feeding the material to be recompressed into the press.

Apparatus of the type contemplated in the instant invention is commonly used for the recompression of previously baled fibers such as cotton and synthetic fibers. Thus, in the handling and baling of cotton, it is commonly the practice to initially press and bale the cotton fiber into so-called "field" bales at the point of origin. Inasmuch as the presses ordinarily employed in such initial baling operations are not adapted for very heavy pressing, the field bales formed thereby are generally large and bulky and low in density and thus occupy considerable space, making storage and transportation relatively costly. Therefore, it is customary to transport such "field" bales from their various points of origin to a central location where they are subjected to relatively heavy pressing to effect recompression and thereby reduce their size and increase their density. Presses employed to effect such recompression of the field bales are commonly referred to as compresses.

Commonly such compresses are the type in which the field bale which is to be recompressed is first introduced into a well arranged beneath the compression chamber and from which it is lifted and compressed by a vertically moving platen. With such constructions, it is usual to arrange the compression chamber, which is defined by hinged side doors, above the level of the floor. The side doors which in their "closed" compression chamber defining position extend vertically with respect to the floor, are hinged at their lower edge so as to swing outwardly and downwardly to a generally horizontal "open" position so as to permit introduction of the field bale and removal of the recompressed bale.

Heretofore it has been necessary to manually introduce the field bale into the compress well, since any mechanized means capable of conveying or feeding the cumbersome field bale into or closely adjacent the well would interfere with the operation of the aforementioned side doors and associated mechanisms. Typically, such manual feeding of the field bale into the compress required the efforts of several men and was obviously not only time consuming but also resulted in increased recompression costs. Therefore, it is obviously highly desirable that rapid feeding of the field bales into the compress be effected largely by mechanized means with a minimum of manual handling. Similarly, it is essential that the mechanized feeding means not only be readily adapted to be employed with existing compress constructions, but also that such feeding means not interfere with the operation of such compresses.

Accordingly, a principal object of the present invention is to provide an improved means for introducing material to be compressed into a compress.

An additional object of the present invention is to provide a mechanized feeding means for a compress.

Another object of the present invention is to provide a mechanized feeding means for a bale compress which is readily adapted to be utilized with existing compress constructions.

A further object of the present invention is to provide an improved bale compress having mechanized means for operative introduction of the material to be compressed therein.

A still further object of the present invention is to provide a mechanized feeding assembly means for introducing a bale of material to be recompressed into a compress with a minimum of manual handling.

Other objects and advantages of the invention will become apparent from the following description and accompanying drawings in which:

FIGURE 1 is a view in side elevation of a compress and compress feeder assembly according to this invention;

FIGURE 2 is a plan view of the compress feeder assembly shown in FIGURE 1;

FIGURE 3 is a sectional view taken along the line 3—3 of FIGURE 2;

FIGURE 4 is a sectional view taken along the line 4—4 of FIGURE 2;

FIGURE 5 is a sectional view taken along the line 5—5 of FIGURE 2; and

FIGURE 6 is an enlarged fragmentary plan view of a portion of the compress feeder assembly.

Referring now to FIGURE 1 of the drawings, there is shown a bale compress 10 having a compress feeder assembly 12 operatively associated therewith. The compress 10 generally includes a supporting frame assembly 14 which extends vertically of the generally horizontal floor surface 16 so as to include the compression chamber 18 located above the floor level and the bale receiving well 20 located below the floor level. The frame 14 is formed of suitable structural elements which together form a rigid, generally rectangular structure. The portion of the frame 14 which extends above the floor is open at the front and rear so as to permit outward and downward swinging movement of the side doors 28 and 30 defining the compression chamber 18 and thus permit access to the well 20. The well 20 which extends beneath the floor level may be formed of suitable front, rear and end plates (not shown) which are connected to and reinforced by the frame 14. The bottom of the well surface is defined by the upper surface of a vertically movable platen 24. The movable platen 24 is movable vertically from its lower or load-unload position, shown by the solid lines, upward to a bale recompression position, as shown by the dotted lines. The movable platen 24 is raised by a suitable power actuated lifting mechanism, the detailed construction of which is not illustrated.

Operatively aligned with and spaced axially above the lower movable platen 24 is a stationary platen 26 which is carried by the frame 14 and is located so as to define the top or upper surface of the compression chamber 18. The work engaging facing surfaces of the movable platen 24 and the stationary platen 26 are provided with conventional slotted bale engaging surfaces which permit application of standard metal bands or wires to the bale while it is held under compression between the two cooperating platens 24 and 26 respectively.

The compression chamber 18 extends above the level of the floor 16 and is defined by front and rear side doors 28 and 30 respectively. The side doors 28 and 30 are of substantially similar construction and are pivotally connected at their lower edges to the frame 14 by suitable hinge means 32 and 34 respectively. The side doors 28 and 30 may thus be swung outwardly and downwardly away from one another and out of compression chamber defining relation to a substantially horizontal position as shown by solid lines in FIGURE 1. Movement of each of the side doors 28 and 30 between the down or open load-unload position and the closed or compression chamber defining position is effected by means of a suitable power actuated means (not shown) acting through mechanical linkages 36 connected to each side door. Since each mechanical linkage 36 is substantially identical, a detailed description of the linkage actuating side door 30 will be sufficient.

The mechanical linkage 36 will be seen to include a link member 38, a pair of laterally spaced pivot arms 42 and a pair of vertically movable actuating rods 50. The link member 38 is pivotally connected at one end to the side door adjacent the upper edge thereof as shown at 40. The other end of the link member 38 is pivotally connected to the free ends of the laterally spaced pivot arms 42 by a suitable pivot pin means 44. The other ends of the pivot arms 42 are pivotally connected by pivot pin means 46 to a pair of laterally spaced stationary bracket members 48 carried by the frame assembly 14. The vertically movable actuating rod members 50 are rotatably connected at their lower ends to the pivot pin means 44 which pivotally connects the link member 38 to the pivot arms 42, as aforementioned. The other ends of the rod members 50 are rotatably journaled, as indicated by reference numeral 52, to a vertically movable actuating member 54. The rotatable connection 52 permits the necessary horizontal movement of the rod members 50 occurring during their movement between the lowermost position, as shown by solid lines and uppermost position, shown by dotted lines in FIGURE 1. The actuating member 54 is moved vertically by the aforementioned power actuated mechanism, the detailed construction of which is not illustrated.

The vertical upward movement of the actuating members 54 will result, by virtue of the linkages 36, in movement of the doors 28 and 30 upwardly from the open load-unload position, shown by the solid lines, to the closed, compression chamber defining position, shown by the dotted lines. Similarly, movement of the actuating members 54 downwardly when the side doors 28 and 30 are in their closed position will result in swinging or pivotal movement of the doors about their respective hinge connections 32 and 34 so as to move outwardly and downwardly of the compression chamber 18 to their substantially horizontal open load-unload position. During such operative movement of the side doors, the arms 42 will be seen to pivot vertically about a substantially horizontal axis 56.

As best seen in FIGURES 1, 2 and 3, the compress feeder assembly 12 is in operative conveying alignment with the bale receiving well 20, and generally includes in cooperative conveying alignment a vertically pivotable power driven conveyor assembly 58, a pivotable transfer plate assembly 60 and a stationary power driven conveyor assembly 62.

The vertically pivotable power driven conveyor assembly 58, which overlies the side door 30 in its open load-unload position, includes a supporting frame assembly 64 operatively mounting a power driven continuous belt conveyor assembly 66. The supporting frame assembly 64 includes a substantially flat plate-like base member 68 having secured to the upper surface thereof upwardly extending brackets 70 operatively mounting the conveyor assembly 66 in fixed relation thereto. As shown in FIGURES 1 and 2, the undersurface of the base member 68 rigidly mounts a pair of laterally spaced generally V-shaped brackets 72, which extend downwardly in vertical alignment with the correspondingly spaced pivot arms 42. Each bracket 72 is rigidly connected at its lower extent to the pivot arm 42 in vertical alignment therewith. The power driven continuous belt conveyor assembly 66 is of substantially conventional construction, and will be seen from FIGURES 2 and 3 to include a pair of longitudinally extending laterally spaced elongated roller mounting members 74 which rotatably carry a plurality of longitudinally spaced transversely extending belt engaging idler rollers 76, a conveyor belt driving roller 78 and a continuous conveyor belt 84 is operative engagement with the rollers 76 and 78.

The idler rollers 76 will be seen to rollingly engage the underside of the conveyor belt 84 so as to movably support the same in a substantially flat generally horizontally disposed conveying plane, as clearly shown by solid lines in FIGURE 3. Rotation of the belt driving roller 78, which imparts conveying movement to the conveyor belt 84, is effected by a suitable power source, preferably an electric motor 80 acting through a conventional belt or chain drive 82. In order to prevent operation of the conveyor when the conveyor assembly 58 has moved out of its substantially horizontal conveying position, as will be more fully described hereinafter, a suitable switch means 85 which is responsive to the position of the conveyor assembly 58 can be provided. Such a position sensitive switch means may be either a mercury or solenoid switch, operative to open the electrical circuit of the motor 80 when the conveyor assembly 58 moves out of its substantially horizontal conveying position.

Adjacent the discharge end of the belt conveyor assembly 66, the upper surface of the base member 68 is provided with a vertically upwardly extending guide bar member 86 adapted to receive the field bale as it is discharged from the conveyor belt 84 and thus aid in guiding the bale into the compress well 20. In this regard, the end of the base member 68 may also be provided with a transversely extending roller 88 which also aids in the introduction of the field bale into the compress well 20.

As will be apparent from FIGURES 1 and 3 of the drawings, by virtue of the foregoing construction, pivotal movement of the pivot arms 42 upwardly to effect the closing movement of the side door 30 to its compression chamber defining position will also result in pivotal upward movement of the conveyor assembly 58 about the common pivot axis 56, thereby providing the necessary clearance for the pivotal closing movement of the side door 30.

The stationary power driven conveyor assembly 62, which is longitudinally spaced from but in conveying alignment with the receiving end of the pivotable conveyor assembly 58, includes suitable bracket means 90 rigidly supporting a power driven continuous belt conveyor assembly 92 in spaced relation to the floor 16. The conveyor assembly 92 is also of a conventional construction and is similar to the continuous belt conveyor assembly 66, as best seen in FIGURES 2, 3 and 4. The continuous belt conveyor assembly 92 includes a pair of longitudinally extending laterally spaced elongated roller mounting members 94 which rotatably carry a plurality of longitudinally spaced transversely extending idler rollers 96, a conveyor belt driven roller 97, a conveyor belt driving roller 98, and a continuous conveyor belt 100 in operative engagement with the rollers 96, 97 and 98.

As previously described in reference to conveyor assembly 66, the idler rollers 96 rollingly engage the underside of the continuous conveyor belt 100 so as to movably support the same in a substantially flat generally horizontally disposed conveying plane.

As best seen in FIGURE 3, the conveyor 92 is spaced from the surface of the floor 16 such that the upwardly facing bale receiving surface of the conveyor belt 100 will lie in substantially the same horizontal plane as the corresponding surface of the continuous conveyor belt 84 of the pivotable conveyor assembly 58, when the latter is in its horizontal loading position. Preferably, the stationary conveyor assembly 62 is provided with laterally spaced vertically extending guide bar assemblies 106 which are effective to eliminate any out of line positioning of the field bales which might occur during operation of the conveyor. Rotation of the belt driving roller 98, which imparts conveying movement to the conveyor belt 100, is effected by a suitable electric motor 102 acting through a conventional belt or chain drive 104.

Transfer of a field bale from the discharge end of the stationary conveyor assembly 62 to the receiving end of the pivotable conveyor assembly 58 is effected by means of a pivotable transfer plate assembly 60. As best seen in FIGURES 2, 3, 5 and 6, the pivotable transfer assembly 60 generally includes a frame assembly 108 which operatively mounts a plurality of longitudinally spaced transversely extending freely rotatable transfer rollers 110. The frame assembly 108 includes longitudinally spaced transversely extending elongated members 112 which are preferably joined by transversely extending angle members 114 so as to form a rigid frame assembly. One end of the transfer plate assembly 60 is pivotally mounted adjacent the discharge end of the stationary conveyor assembly 62 so as to permit vertical pivotal movement of the other free end thereof, adjacent the receiving end of the pivotable conveyor assembly 58, relative to the floor 16. Preferably, such pivotal connection is effected by means of suitable pivot pin and bearing means 116 connecting the end of the transfer plate assembly frame to the elongated roller mounting members 94 of the stationary conveyor assembly 62. The free end of the transfer plate assembly 60 also rotatably mounts another freely rotatable transversely extending roller 118 spaced below the end transfer roller 110'. The roller 118 will be seen to be spaced longitudinally slightly further away from the receiving end of the pivotable conveyor 58 than the transfer roller 110' so as to permit the transfer of plate assembly 60 to assume its operative substantially horizontal transfer position, as shown by the solid lines in FIGURE 3. The downward vertical movement of the free end of the transfer plate assembly 60 will be seen to be limited by engagement of the roller 118 rotatably carried adjacent the free end of the transfer plate assembly by the conveyor belt 84 of the pivotable conveyor assembly 58.

Moreover, when the transfer plate assembly is in its operative substantially horizontal transfer position, the transfer rollers 110 and 110' will be seen to define a transfer surface lying substantially in the conveying plane defined by the upwardly facing surfaces of the continuous conveyors belts 84 and 100 so as to effect the transfer of a bale from the discharge end of the stationary conveyor assembly 62 to the receiving end of the pivotable conveyor assembly 58.

As best seen in FIGURE 3, pivotable upward movement of the pivotable conveyor assembly 58 as it moves with the pivot arms 42 during movement of the side door 30 to its closed compression chamber defining position, will result in the roller 118 rollingly engaging the conveyor belt 84 and the upward pivotal movement of the transfer plate 60 about the pivotal connection 116. Movement of the pivotable conveyor assembly 58 downwardly as the side door 30 is moved to its open load-unload position, will similarly result in downward pivotal movement of the transfer plate assembly 60 into operative transfer alignment with the stationary and pivotable conveyor assemblies 62 and 58, respectively.

In operation, with the side door 30 in its open load-unload position and the feeder assembly disposed in operative horizontal conveying alignment, a field bale 120, which has had the initially applied metal bandings removed at a station adjacent the receiving end of the stationary conveyor assembly 62, is placed on the stationary continuous conveyor belt 100. The bale 120 will be carried by the conveyor belt 100 to the discharge end of the stationary conveyor assembly 62 and onto the rollers 110 of the transfer plate assembly 60 which, by virtue of the movement imparted to the bale 120 by the conveyor belt 100, will effect transfer thereof to the receiving end of the conveyor belt 84 of the pivotable conveyor assembly 58. The bale 120 will be carried by the conveyor belt 84 to the discharge end of the conveyor assembly 58 where it will be operatively received by the guide member 86 adjacent the well 20 of the compress. At this point, the field bale 120 may be guided manually into operative position in the well 20, whereupon the mechanical linkages 36 are actuated so as to swing the side doors 28 and 30 upwardly into their closed compression chamber defining position. Movement of the pivot arms 42 occurring during the closing of the side door 30 will result in upward pivotable movement of the pivotable conveyor 58, as well as pivotable upward movement of the transfer plate assembly 60. As aforementioned, in response to the upward pivotal movement of the conveyor 58, the position sensitive switch 85 will operate to open the electrical circuit of the motor 80 and thereby deactivate or stop the conveying movement of the conveyor assembly 66. Such pivotable upward movement of the pivotable conveyor assembly 58 will permit the necessary clearance for the door 30 to move from its open load-unload position to its closed compression chamber defining position. When the side doors 28 and 30 are in their closed position, the lower movable platen 24 will move upwardly lifting the field bale 120 out of the well 20 and into the compression chamber 18 effecting recompression of the field bale 120. When the desired amount of recompression has been obtained, the side doors are actuated through the linkage 36 to swing outwardly and downwardly away from their compression chamber defining position to their open load-unload position while maintaining the bale under the recompressing pressure exerted by the lower platen 24. Downward movement of the side door 30 as a result of actuation of the mechanical linkage 36 will result in the return of the pivotable conveyor assembly 58 to its horizontal conveying plane and likewise return of the transfer plate to its operative horizontal position. In response to the return of the conveyor assembly 58 to its horizontal conveying plane, the position sensitive switch will operate to close the electrical circuit of the motor 80 so as to permit energization thereof. While recompressing pressure is maintained on the field bale, suitable metal bandings are applied thereto, for example manually, operator room being provided on either side of the bale guide 86. After this, the lower movable platen 24 is moved downwardly into the well, permitting removal of the recompressed bale from the compress 10. The apparatus is now ready to begin another recompression cycle.

It will thus be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

What is claimed is:

1. For use with an apparatus for operating on material of the type having a material receiving chamber including at least one vertically extending member defining a side wall thereof, said member being pivotally movable outwardly of the apparatus and out of its side wall defining position to a load-unload position to permit introduction of said material into said apparatus: a conveying means for conveying said material into said apparatus, said conveying means extending into said apparatus when said side wall defining member is in its load-unload position so as to discharge the material conveyed adjacent the material receiving chamber of said apparatus, said conveying means when so positioned also extending at least partially into the path followed by said side wall defining member in moving between said load-unload position and said side wall defining position; means for operatively connecting said conveying means to the side wall defining member to cause said conveying means to be movable in response to the movement of said side wall defining member between said load-unload position and said side wall defining position relative to said apparatus and out of material conveying relation therewith so as to permit movement of said side wall defining member between said load-unload position and said side wall defining position; transfer means operatively associated with said conveying means so as to transfer material to said conveying means when said side wall defining member is in its load-unload position; and means engageable with said conveying means and said transfer means to cause said transfer means to be movable in response to the movement of said side wall defining member to its side wall defining position out of operative transferring association with said conveying means to permit said conveying means to move out of material conveying relation with the apparatus.

2. The structure defined in claim 1 wherein the conveying means includes a power driven continuous conveyor element and the transfer means is operative to transfer the material to said continuous conveyor element.

3. The structure defined in claim 1 wherein the conveying means includes a power driven continuous conveyor element.

4. For use with an apparatus for operating on material of the type having a material receiving chamber including at least one vertically extending member defining a side wall thereof, said member being pivotally movable outwardly of the apparatus and out of its side wall defining position to a load-unload position to permit introduction of said material into said apparatus: a conveying means including a power driven conveyor for conveying said material into said apparatus, said conveying means extending into said apparatus when said side wall defining member is in its load-unload position so as to discharge the material conveyed adjacent the material receiving chamber of said apparatus, said conveying means when so positioned also extending at least partially into the path followed by said side wall defining member in moving between said load-unload position and said side wall defining position; means for operatively connecting said conveying means to the side wall defining member to cause said conveying means to be movable in response to the movement of said side wall defining member between said load-unload position and said side wall defining position relative to said apparatus and out of material conveying relation therewith so as to permit movement of said side wall defining member between said load-unload position and said side wall defining position; and means responsive to the position of said conveying means operative to deactivate said power driven conveyor and thereby stop the conveying movement thereof when said conveying means moves out of material conveying relation with said apparatus.

5. A press for compressing material comprising in combination: a well for receiving the material to be compressed; a compression chamber overlying said well, said compression chamber including at least one vertically extending member defining a side wall thereof, said member being pivotally movable outwardly of its side wall defining position to a load-unload position to thereby permit introduction of material into said well; a compression member movable upwardly in said well operative to lift material into said compression chamber and thereafter in cooperation with said compression chamber effect compression of said material; a conveying means including a power driven continuous conveyor element for conveying said material into said press, said conveying means extending into said press when said side wall defining member is in its load-unload position so as to discharge the material conveyed adjacent said well, said conveying means when so positioned also extending at least partially into the path followed by said side wall defining member in moving between said load-unload position and said side wall defining position; means operatively connecting said conveying means to said side wall defining member to cause said conveying means to move in response to the movement of said side wall defining member between said load-unload position and said side wall defining position relative to said press and out of material conveying relation therewith so as to permit movement of said side wall defining member between said load-unload position and said side wall defining position; and means responsive to the position of said conveying means operative to deactivate said power driven conveyor element and thereby stop conveying movement of said conveyor element when said conveying means moves out of material conveying relation with said press.

6. For use with an apparatus for operating on material of the type having a material receiving chamber including at least one vertically extending member defining a side wall thereof, said member being pivotally movable outwardly of the apparatus and out of its side wall defining position to a load-unload position to permit introduction of said material into said apparatus; a device for feeding material into said apparatus including a first conveying means, a second conveying means, said second conveying means including a power driven continuous conveyor element extending into said apparatus when said side wall defining member is in its load-unload position so as to discharge the material conveyed adjacent the material receiving chamber of said apparatus, said continuous conveyor element when so positioned also extending at least partially into the path followed by said side wall defining member in moving between said load-unload position and said side wall defining position, means for operatively connecting said second conveying means to the side wall defining member to cause said second conveying means to be movable in response to the movement of said side wall defining member between said load-unload position and said side wall defining position relative to said apparatus and out of material conveying relation therewith so as to permit movement of said side wall defining member between said load-unload position and said side wall defining position, a transfer means operatively associating said first and second conveying means so as to transfer material conveyed by said first conveying means to the continuous conveyor element of said second conveying means when said second conveying means is in material conveying relation with said apparatus, and means engageable with said second conveying means and said transfer means to cause said transfer means to be movable out of the position operatively associating said first and second conveying means to thereby permit said second conveying means to move out of material conveying relation with said apparatus.

7. The structure defined in claim 6 wherein the second conveying means includes means responsive to the position of said second conveying means operative to deactivate said power driven conveyor element and thereby stop conveying movement of said conveyor element when said second conveying means moves out of material conveying relation with said apparatus.

8. The structure defined in claim 6 wherein said first conveying means includes a power driven continuous conveyor element extending adjacent the transfer means so as to operatively discharge the material carried by the continuous conveyor element of said first conveyor means onto the transfer means when said transfer means is in the position operatively associating said first and second conveying means.

9. A press for compressing material comprising in combination: a well for receiving the material to be compressed; a compression chamber overlying said well, said compression chamber including at least one vertically-extending member defining a side wall thereof, said member being pivotally movable outwardly of its side wall defining position to a load-unload position to thereby permit introduction of material into said well; a compression member movable upwardly in said well operative to lift material into said compression chamber and thereafter in cooperation with said compression chamber effect compression of said material; a conveying means for conveying said material into said press, said conveying means extending into said press when said side wall defining member is in its load-unload position so as to discharge the material conveyed adjacent said well, said conveying means when so positioned also extending at least partially into the path followed by said side wall defining member in moving between said load-unload position and said side wall defining position; means operatively connecting said conveying means to said side wall defining member to cause said conveying means to move in response to the movement of said side wall defining member between said load-unload position and said side wall defining position relative to said press and out of material conveying relation therewith so as to permit movement of said side wall defining member between said load-unload position and said side wall defining position; transfer means operatively associated with said conveying means so as to transfer material to said conveying means when said side wall defining member is in its load-unload position; and means engageable with said conveying means and said transfer means to cause said transfer means to be moved in response to the movement of said side wall defining member to its side wall defining position out of operative transferring association with said conveying means to permit said conveying means to move out of conveying relation with the press.

10. The structure defined in claim 9 wherein the conveying means includes a power driven continuous conveyor element and the transfer means is operative to transfer the material to said continuous conveyor element.

11. The structure defined in claim 9 wherein the conveying means includes a power driven continuous conveyor element.

12. For use with a compress for compressing a bale of material wherein said compress includes a well for receiving the bale to be compressed and a compression member movable upwardly in said well operative to lift said bale into a compression chamber overlying said well and thereafter in cooperation with said compression chamber to effect compression of said bale, said compression chamber including at least one vertically extending member defining a side wall thereof, said side wall defining member being pivotally movable downwardly and outwardly out of its side wall defining position to a substantially horizontal load-unload position to thereby permit introduction of said bale into said well: a conveying means for conveying said bale into said compress, said conveying means overlying said side wall defining member and extending into said compress adjacent said well so as to discharge the bale conveyed adjacent said well, said conveying means when so positioned also extending at least partially into the path followed by said side wall defining member in moving between said load-unload position and said side wall defining position; means for operatively connecting said conveying means to the side wall defining member to cause said conveying means to be movable in response to the movement of said side wall defining member between said load-unload position and said side wall defining position relative to said compress and out of material conveying relation therewith so as to permit movement of said side wall defining member between said load-unload position and said side wall defining position; transfer means operatively associated with said conveying means so as to transfer the bale to said conveying means when said side wall defining member is in its load-unload position; and means engageable with said conveying means to cause said transfer means to be movable in response to the movement of said side wall defining member to its side wall defining position out of operative transferring association with said conveying means to permit said conveying means to move out of bale conveying relation with the compress.

13. The structure defined in claim 12 wherein the conveying means includes a power driven continuous conveyor element.

14. The structure defined in claim 12 wherein the conveying means includes a power driven continuous conveyor element and the transfer means is operative to transfer the bale to said continuous conveyor element.

15. For use with a compress for compressing a bale of material wherein said compress includes a well for receiving the bale to be compressed and a compression member movable upwardly in said well operative to lift said bale into a compression chamber overlying said well and thereafter in cooperation with said compression chamber to effect compression of said bale, said compression chamber including at least one vertically extending member defining a side wall thereof, said side wall defining member being pivotally movable downwardly and outwardly out of its side wall defining position to a substantially horizontal load-unload position to thereby permit introduction of said bale into said well: a device for feeding material into said compress including a first conveying means, a second conveying means, said second conveying means including a power driven continuous conveyor element overlying said side wall defining member and extending into said compress adjacent said well so as to discharge the bale conveyed adjacent said well, said continuous conveyor element when so positioned also extending at least partially into the path followed by said side wall defining member in moving between said load-unload position and said side wall defining position, means for operatively connecting said conveying means to the side wall defining member to cause said second conveying means to be movable in response to the movement of said side wall defining member between said load-unload position and said side wall defining position relative to said compress and out of bale conveying relation therewith so as to permit movement of said side wall defining member between said load-unload position and said side wall defining position, a transfer means operatively associating said first and second conveying means so as to transfer the bale conveyed by said first conveying means to the continuous conveyor element of said second conveying means when said second conveying means is in bale conveying relation with said compress, and means engageable with said second conveying means and said transfer means to cause said transfer means to be movable out of the position operatively associating said first and second conveying means to thereby permit said second conveying means to move out of bale conveying relation with said compress.

16. The structure defined in claim 15 wherein the second conveying means includes mean responsive to the position of said second conveying means operative to deactivate said power driven conveyor element and thereby stop conveying movement of said conveyor element when said second conveying means moves out of bale conveying relation with said compress.

17. The structure defined in claim 15 wherein said first conveying means includes a power driven continuous conveyor element extending adjacent the transfer means so as to operatively discharge the bale carried by the continuous conveyor element of said first conveyor means onto the transfer means when said transfer means is in the position operatively associating said first and second conveying means.

18. The structure defined in claim 15 wherein the second conveying means and the transfer means are mounted for pivotal movement about axes substantially parallel to the pivot axis of said side wall defining member.

19. For use with a compress for compressing a bale of material wherein said compress includes a well for receiving the bale to be compressed and a compression member movable upwardly in said well operative to lift said bale into a compression chamber overlying said well and thereafter in cooperation with said compression chamber to effect compression of said bale, said compression chamber including at least one vertically extending member defining a side wall thereof, said side wall defining member being pivotally movable downwardly and outwardly of its side wall defining position to a substantially horizontal load-unload position to thereby permit introduction of said bale into said well: a power driven conveying means for conveying said bale into said compress, said conveying means overlying said side wall defining member and extending into said compress adjacent said well so as to discharge the bale conveyed adjacent said well, said conveying means when so positioned also extending at least partially into the path followed by said side wall defining member in moving between said load-unload position and said side wall defining position; means for operatively connecting said conveying means to the side wall defining member to cause said conveying means to be movable in response to the movement of said side wall defining member between said load-unload position and said side wall defining position relative to said compress and out of material conveying relation therewith so as to permit movement of said side wall defining member between said load-unload position and said side wall defining position; and means responsive to the position of said conveying means operative to deactivate said power driven conveyor and thereby stop the conveying movement thereof when said conveying means moves out of bale conveying relation with said compress.

References Cited by the Examiner

UNITED STATES PATENTS

| | | | |
|---|---|---|---|
| 397,393 | 2/89 | Smades | 100—255 X |
| 759,399 | 5/04 | Sheppard | 100—255 X |
| 865,734 | 9/07 | Webb | 100—255 X |
| 1,086,886 | 2/14 | Bernheim | 198—157 |
| 1,637,976 | 8/27 | Webb | 100—255 |
| 2,061,658 | 11/36 | Hubbert | 100—232 |
| 2,568,073 | 9/51 | Koppel et al. | 198—156 X |
| 2,690,115 | 9/54 | Sinclair | 100—255 X |
| 2,780,989 | 2/57 | Guy | 100—215 X |
| 3,068,783 | 12/62 | Brown | 100—215 X |

FOREIGN PATENTS 367,213  2/32  Great Britain.

WALTER A. SCHEEL, *Primary Examiner.*